United States Patent [19]
Kamon et al.

[11] Patent Number: 5,847,884
[45] Date of Patent: Dec. 8, 1998

[54] IMAGE READING APPARATUS

[75] Inventors: Koichi Kamon; Shinya Matsuda; Noriyuki Okisu, all of Osaka, Japan

[73] Assignee: Minolta Co., Ltd., Osaka, Japan

[21] Appl. No.: 890,352

[22] Filed: Jul. 9, 1997

[51] Int. Cl.$^6$ .................... G02B 27/02; H04N 1/04
[52] U.S. Cl. .................... 359/806; 358/471; 358/474; 250/208.1; 355/55
[58] Field of Search .................... 359/806; 250/559.19, 250/208.1, 559.06; 358/471, 474, 406, 443; 355/25, 55

[56] References Cited

U.S. PATENT DOCUMENTS

| | | | |
|---|---|---|---|
| 5,003,167 | 3/1991 | Arques | 250/208.1 |
| 5,276,530 | 1/1994 | Siegel | 358/406 |
| 5,362,958 | 11/1994 | Ando | 250/208.1 |
| 5,416,609 | 5/1995 | Matsuda et al. | 358/474 |
| 5,585,926 | 12/1996 | Fujii et al. | 358/471 |
| 5,616,914 | 4/1997 | Matsuda | 250/208.1 |

*Primary Examiner*—Loha Ben
*Attorney, Agent, or Firm*—Sidley & Austin

[57] ABSTRACT

An image reading apparatus which reads document surfaces of open book-like documents placed on a document platen in a face upward condition, the image reading apparatus comprises; a first detector which detects a height distribution of a document surface in a main scanning direction, a second detector which detects a height distribution of the document surface in a sub-scanning direction, and a direction discrimination device for discriminating whether a placement direction of the document is a main scanning direction or a sub-scanning direction based on the height distributions.

15 Claims, 16 Drawing Sheets

M2 sub scan direction

M1 main scan direction

IMAGE READING APPARATUS

BACKGROUND OF THE INVENTION

1. Field of the Invention

The present invention relates to an image reading apparatus for reading bound documents such as books, magazines and the like.

2. Description of the Related Art

Image forming apparatuses called book scanners have been commercialized. In these book scanners, an image sensing unit is arranged above a document platen, and an open space of several tens of centimeters is provided between said document platen and said image sensing unit. When a bound type document such as a report, magazine and the like (hereinafter referred to as "book document") is read by such a book scanner, a user places the book document on the document platen in an open state with the open pages facing upward. An illumination lamp is lighted when a start key is turned ON, a pre-scan is first executed to measure the reading environment. Reading operation settings are set base on the information obtained in the pre-scan, and thereafter the main scan is executed. In the main scan, a read image is sequentially output to an external device. When the external device is a printer, a copy image is formed in real time. When a book scanner is used, the efficiency of the reading operation for a plurality of pages is increased because the pages can be turned while the document is on the document platen. Furthermore, damage to the book document can be markedly reduced compared to arrangements wherein the book document is placed face downward. In this discussion, book documents also include filed documents.

Unlike a document comprising a single sheet, the document surface (reading object surface) of book documents may be curved. That is, when set in an open state on the document platen, the height of the document surfaces differ depending on the lateral position. Therefore, so-called unsharp focus and distortion corresponding to the state of curvature is produced in the read image. Book scanners measure the state of curvature, and execute distortion correction and focus control in accordance with the measurement result. The read image output to an external device has an image quality similar to that obtained when reading a single sheet document. Methods of measuring the state of curvature of a document surface include a method of image analysis wherein a part of the document surface called the "head" is read (Japanese Laid-Open Patent Application No. 5-161002). In this method, a document image is focused and the head (edge surface) is read by providing a mirror disposed at an upward inclination on the document platen. Another method is a slit projection method used in three dimensional measurement (Japanese Laid-Open Patent Application No. 5-219323).

Conventional book scanners are constructed so as to measure the state of curvature of a document surface only in one direction along the top surface (i.e., the surface supporting the document) of the document platen. That is, placement of book documents is limited to a single direction in order to obtain a read image devoid of unsharp focus and distortion. specifically, a user must place a book document so that the direction of the open document matches the lateral direction of the document platen.

For example, when printing a document image (A4 size) of a single page on one side of an open-faced document which is A3 in size at equal magnification, there is no problem when the book document is placed facing in a standard direction. In contrast, when printing a two-page A3 size enlargement, the direction in which the book document is placed must be rotated 90° relative to the standard direction in order to print the entire document image. A disadvantage arises, however, in that the quality of the read image is reduced when the direction of document placement is changed.

Copying apparatuses of the type in which documents are placed face down have a function for eliminating the shadow of the binding region of a book document (i.e., the center area of the open document). The direction of document placement may be either the latitudinal or longitudinal direction. The user must specify the document placement direction, and a correct document image cannot be obtained when said specification is incorrect. Such apparatuses are provided with a further function for determining the document placement direction from the relationship of measured dimensions by measuring the length and width dimensions of the document to allow selection of paper size and copy magnification. On the other hand, the specification of the direction in which the open book document faces cannot be reliably realized from the dimensional ratio of height to width when the document is in an open state.

SUMMARY OF THE INVENTION

An object of the present invention is to improve the practicality of the image reading apparatus by alleviating restrictions on the direction of placement of documents when reading opened book-like documents (open-faced documents), and reducing operational demands.

These objects are achieved by providing a first book document reading apparatus comprising:

an image sensing device for converting a document image to electrical signals;

a first measuring means for measuring the state of curvature of a document surface in a main scan direction;

a second measuring means for measuring the state of curvature of a document surface in a subscan direction;

a focusing mechanism for forming an image of a document image on said image sensing device; and a focus control means which, when an open-faced book document is read, controls said focusing mechanism in accordance with the state of curvature of a document surface in the subscan direction when the document placement direction is the subscan direction, and control said focusing mechanism in accordance with the state of curvature of a document surface in the main scan direction the document placement direction is the main scan direction.

The aforesaid objects are attained by providing a second book document reading apparatus comprising:

an image sensing device for converting a document image to electrical signals;

a first measuring means for measuring the state of curvature of a document surface in a main scan direction;

a second measuring means for measuring the state of curvature of a document surface in a subscan direction;

an image processing means for correcting distortion in the read image caused by curvature of a document surface; and correction control means for controlling said image processing means in accordance with the state of curvature of a document surface in a subscan direction when the document placement direction is the subscan direction, and controlling said image processing means in accordance with the state of curvature of a document surface in a main scan direction when the document placement direction is the main scan direction.

The aforesaid objects are attained by providing a third book document reading apparatus comprising:

an image sensing device for converting a document image to electrical signals;

reflecting panels for reading the edge surfaces of an open-faced document in the main scan direction and the subscan direction by said image sensing device;

direction discrimination means for discriminating the placement direction of said document based on image reading information of said edge surfaces in each said direction expressing the state of curvature of the document surface; and reading control means for executing controls in accordance with the state of curvature in the document placement direction.

These and other objects advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
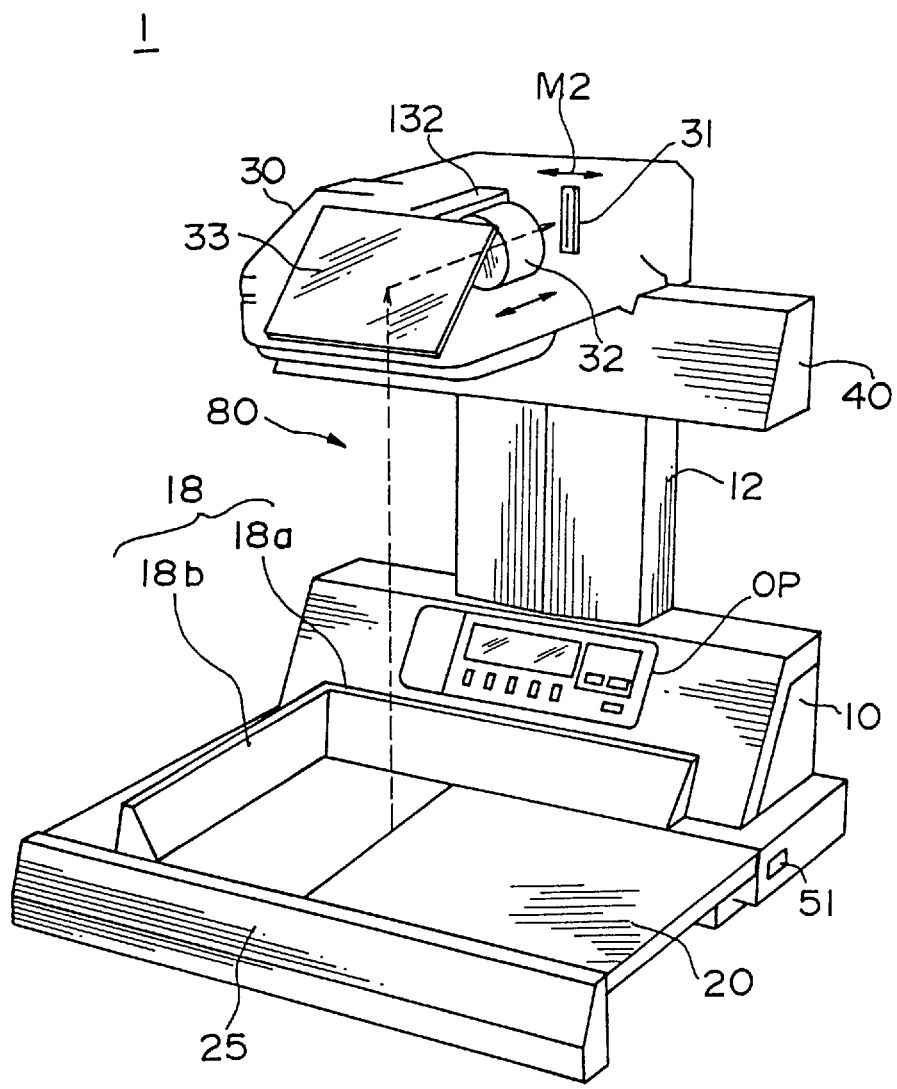
FIG. 1 is a perspective view illustrating a method of measuring the state of curvature of a document surface.
Figure 2A:
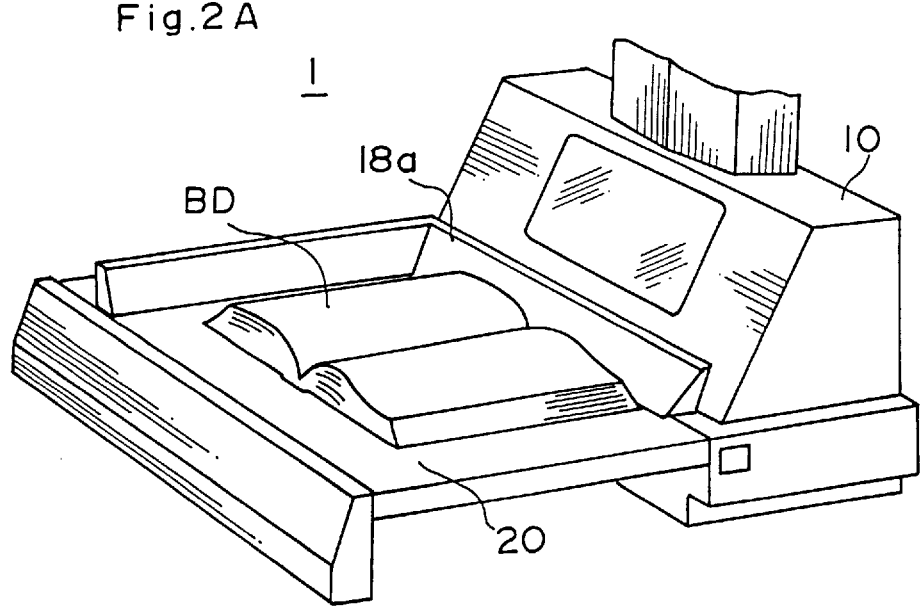
FIGS. 2(A) and 2(B) show how a book scanner is used.
Figure 2B:
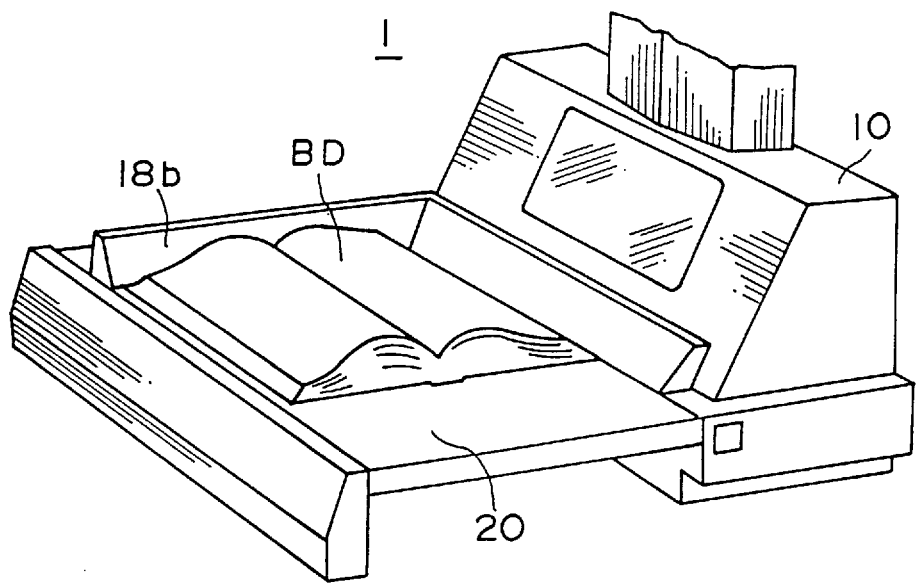
Figure 3A:
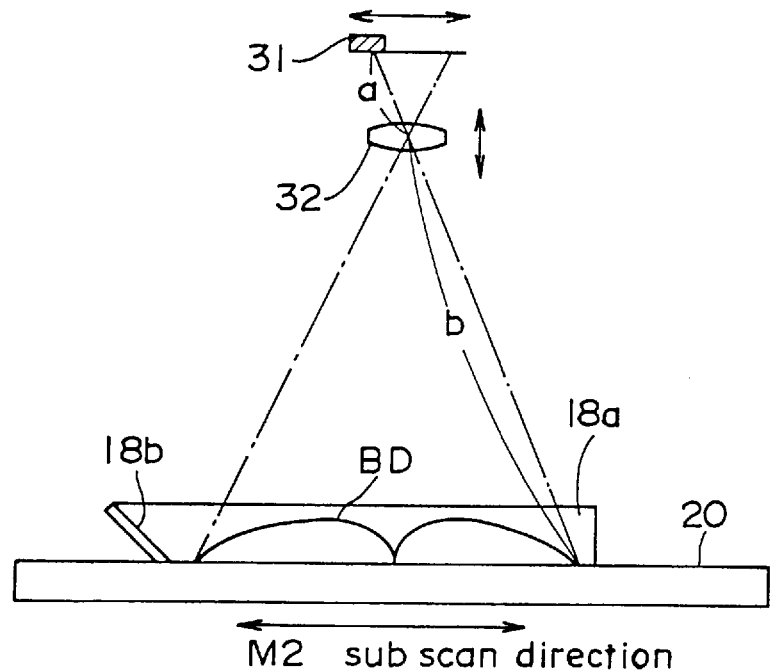
FIGS. 3(A) and 3(B) show a document being read by a book scanner.
Figure 3B:
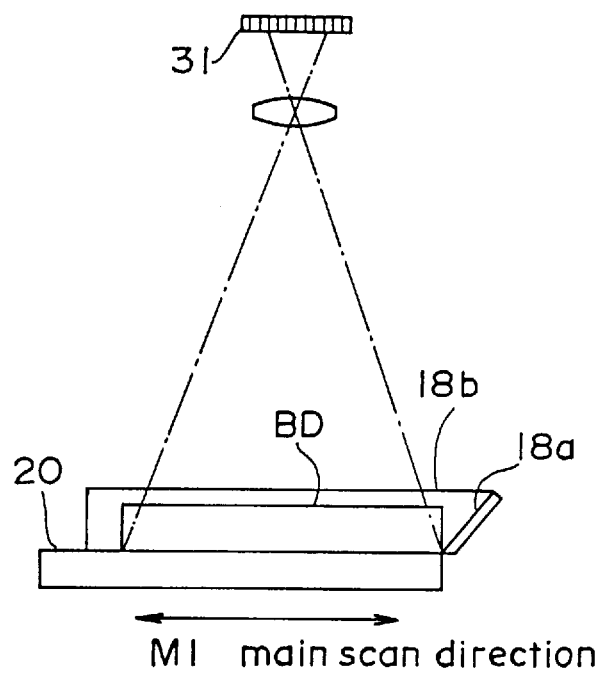

FIG. 1 is a perspective view of the exterior of a book scanner 1; FIGS. 2(A) and 2(B) show how a book scanner is used; FIGS. 3(A) and 3(B) show a document being read by a book scanner.

Book scanner 1 is an image reading apparatus suitable for reading book-like documents (i.e., open-faced, multipage documents), and comprises a main housing 10 for accommodating electrical circuits and the like, a dark-colored document platen 20 for supporting documents, image sensing unit 30 for converting a document image to electrical signals, and lamp unit 40 for illuminating the document. Document platen 20 arranged on the front side of housing 10. Image sensing unit 30 is disposed above document platen 20 in a cantilever configuration supported by a column 12 extending upward from the top surface of housing 10. Lamp unit 40 is fixedly mounted at a position on the bottom side of image sensing unit 30 on column 12. An empty space 80 which is freely accessible to the outside of the apparatus is provided between document platen 20 and image sensing unit 30, and is of sufficient size to allow the placement of book documents on the document platen 20. The distance between the document platen 20 and the bottom surface of the image sensing unit 30 is 30 cm or more to allow turning of the pages of the book document placed on document platen 20.

An operation panel OP including a liquid crystal display is provided on the top edge of the front surface of housing 10, and a main switch 51 is provided on the right hand side of housing 10 as viewed facing toward operation panel OP. An arm rest 25 is provided on the front side of document platen 20.

A flat L-shaped projection panel 18 for detecting the height of a document surface is arranged on the top surface of document platen 20. Projection panel 18 comprises a projection panel 18a extending along the back edge of document platen 20, and a projection panel 18b extending in a front-to-back direction on the left hand side of document platen 20. The surface of these projection panels 18a and 18b are glossy surfaces, and are inclined 45° relative to the top surface of document platen 20. The image of the edge surface (hereinafter referred to as "side surface") of a book document in the document placement direction is reflected by one or another of these projection panels 18a or 18b, and an image of the top edge surface in a direction perpendicular to the direction of document placement is reflected in the other projection panel. The images reflected in projection panels 18a and 18b are read together with the document image.

In FIG. 1, the image sensing unit 30 is comprises a line sensor 31 of a charge-coupled device (CCD) array type, image forming lens 32, and mirror 33. A document image is projected onto a photoreceptive surface of line sensor 31 via mirror 33 and image forming lens 32. Image forming lens 32 is provided so as to be movable in the front-to-back directions, and is positioned by an autofocus (AF) mechanism(lens moving unit) 132. Line sensor 31 is mounted to the movable body of a scanning mechanism not shown in the illustrations, and is moved parallel to the lateral direction (subscan direction) via a motor M2 so as to maintain the direction of the CCD element array in a vertical direction. A two-dimensional read image of the document image is accomplished by the aforesaid parallel movement. That is, in book scanner 1, a two-dimensional image sensing plane is formed via the movement of line sensor 31. When an area sensor is used rather than the line sensor 31, the photoreceptive surface becomes the image sensing plane. The main scan direction of the document image is the front-to-back direction on document platen 20, and the and is a vertical direction on the image sensing plane. When operating book scanner 1, a user places an opened book document BD face upward on document platen 20, as shown in FIGS. 2(A) and 2(B). At that time, the boundary between right and left pages is aligned with the center of document platen 20 in either the lateral direction or the front-to-back direction, and the book document BD is positioned by pressing it against either the front edge of projection panel 18a or the front edge of projection panel 18b. The boundary between projection panels 18a and 18b and the document platen 20 is the standard line for document placement. In the example shown in FIG. 2(A), the book document BD is positioned on the document platen 20 so that the document placement direction if the lateral direction (i.e., subscan direction). This document placement direction is referred to as "vertical placement." In vertical placement, the image of the head of book document BD is reflected in projection panel 18a, and the image of the side surface is reflected in projection panel 18b. In the example of FIG. 2(B), the book document BD is positioned so that the document placement direction is the front-to-back direction. This document placement direction is referred to as "horizontal placement." In horizontal placement, the image of the side surface of book document BD is reflected in projection panel 18a, and the image of the head is reflected in projection panel 18b. In book scanner 1, a user can specify either vertical placement or horizontal placement via the operation panel OP. Furthermore, when a user specifies the automatic discrimination mode, vertical placement and horizontal placement can be discriminated by book scanner 1.

Book scanner 1 executes a pre-scan and a main scan on the same document. Since book document BD has a document surface S1 which is curved unlike a sheet document, focus adjustment for image sensing is required in accordance with the state of said curvature. Correction of distortion caused by compression in the subscan direction, and processing to handle differences in luminance are also necessary. Therefore, the state of curvature is measured in the pre-scan, and the operation conditions of the main scan are set based on the measurements obtained in the pre-scan. Image output to an external device is accomplished during the main scan. Document reading modes include a batch reading mode for reading both right and left pages in a batch, and individual reading mode for reading right and left pages separately (book division mode). Both a pre-scan and a main scan are executed regardless of what reading mode is selected.

Figure 4A:
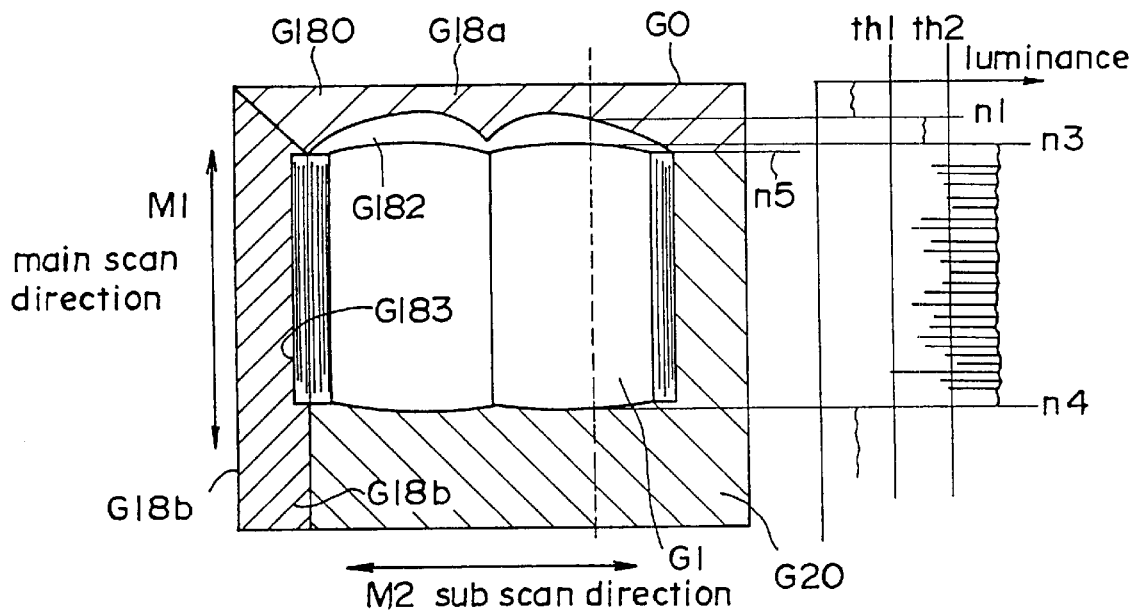
FIGS. 4(A) and 4(B) illustrate a method of measuring the state of curvature of a document surface.
Figure 4B:
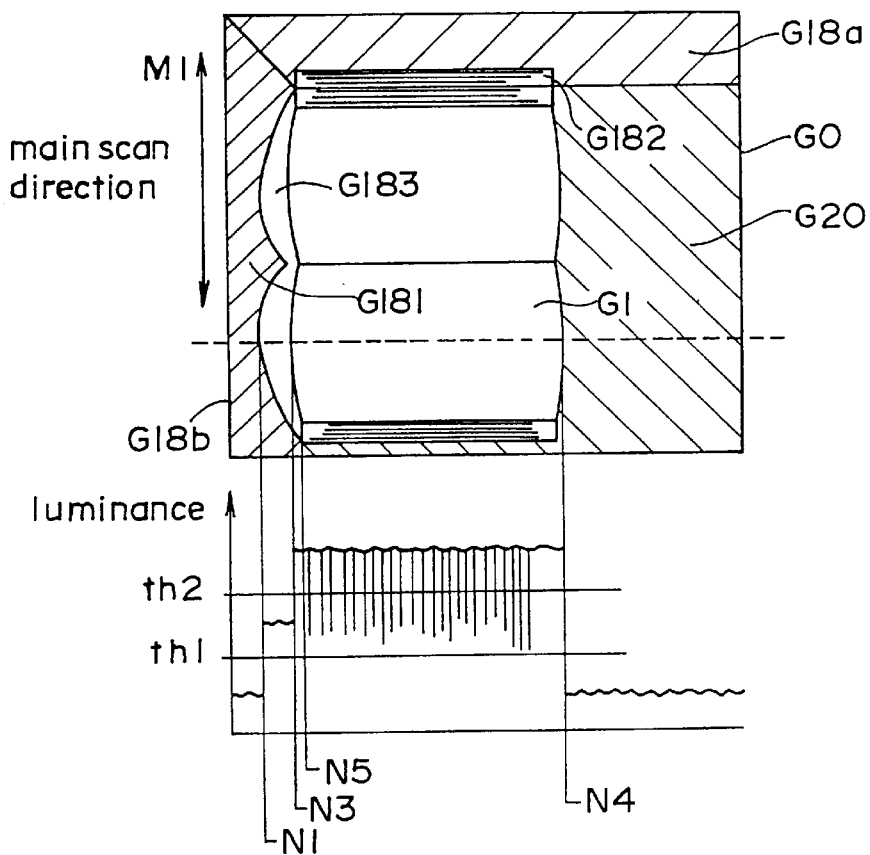

FIGS. 4(A) and 4(B) illustrate a method of measuring the state of curvature of document surface S1. FIG. 4(A) shows the luminance distributions of the target main scan lines and the read image with vertical placement, and FIG. 4(B) shows the luminance distributions of the target subscan lines and the read image with horizontal placement. In the drawings, the dashed lines indicate the position of the target main scan lines and target subscan lines.

The read image G0 comprises the read image G1 of book document BD, the read image G20 of document platen 2, the read image G18a of projection panel 18a, and the read image G18b of projection panel 18b. The image G182 in read image G18a and the image G183 in read image G18b express the shape of the edge surface (head or side surface) of a placed book document BD. The image G180 outside of the image G182 in read image G18a is the background image reflected in projection panel 18a, and the image G181 outside the image G183 in the read image G18b is the background image reflected in projection panel 18b.

Since the previously mentioned document platen 20 is provided with a dark coloration, the read image G20 of document platen 20 is a darker image compared to other images. Accordingly, the read images G1, and images G182 and G183 can be extracted by discriminating the luminance of read image G0. Specifically, when vertical placement is specified, the luminance (i.e., pixel value) is checked sequentially from the top pixel in the main scan direction of each main scan line, and the pixel position (pixel number) n1 on the top side of a range at which luminance exceeds a first threshold value th1 is detected, and the pixel positions n3 and n4 on the top side and bottom side of a range at which luminance exceeds a second threshold value th2 (th2>th1) are detected. The number of pixels between the pixel position n1 and the known pixel position n5 corresponding to the front edge of projection panel 18a corresponds to the height of the document surface at the target main scan line, and the number of pixels between the pixel position n3 and the pixel position n4 corresponds to the size of the document in the main scan direction. When horizontal placement is specified, the luminance is checked sequentially from the top pixel in the subscan direction of each subscan line, and the main scan line position (line number) N1 on the top side of a range at which luminance exceeds a first threshold value th1 is detected, and the main scan line positions N3 and N4 on the top side and bottom side of a range at which luminance exceeds a second threshold value th2 are detected. The number of pixels between the main scan line position N1 and the known main scan line position N5 corresponding to the front edge of projection panel 18b corresponds to the height of the document surface at the target line, and the number of pixels between the main scan line position N3 and the main scan line position N4 corresponds to the size of the document in the subscan direction. The state of curvature of the document surface in the subscan direction is specified by the collection of data expressing the height of the document surface at each main scan line, and the state of curvature in the main scan direction is specified by the collection of data expressing the height of the document surface at each subscan line.

In the automatic discrimination mode, the pixel position n1 is detected and the main scan line position N1 is detected. That is, the state of curvatures are measured in both the subscan direction and the main scan direction. The document placement direction of the book document BD is specified by comparing the state of curvature in both directions.

In the read image G0, the edge of read image G1 is curved because the height of the document surface is not uniform. That is, an object near the image sensing plane appears larger than an object farther from said plane. During the main scan, distortion correction in the direction of document placement and correction of distortion in a direction perpendicular to the direction of document placement are accomplished. Distortion in the direction of document placement (expansion process) is a variable magnification process which duplicates lines in accordance with the amount of change (i.e., inclination) in the height of the document surface at each small interval. Distortion correction in a direction perpendicular to the direction of document placement is a variable magnification process which duplicates pixels corresponding to the difference of increase or decrease between the document surface and a standard surface at each position in the direction of document placement, wherein a plane at a position a constant distance (e.g., 5 cm) above the document platen 20 is set as the standard surface.

Book scanner 1 executes image sensing focus adjustment during the main scan in accordance with the state of curvature in the document placement direction measured by the previously described method. When the document placement direction is the subscan direction, i.e., when vertical placement is specified, the image forming lens 32 is moved so as to obtain a focused state coincident with the progress of the subscan. When the position of each line within the image surface is high for each line, the image forming lens 32 is brought closer to the document surface, and conversely moved farther away from the document surface when the position of each line within the image surface is low for each line. The position of image forming lens 32 can be calculated by Equation (1) below which is a well known geometric conditional equation.

$$1/f = (1/a) + (1/b) \quad (1)$$

f: focal length of the image forming lens
a: image plane distance (refer to FIG. 3)
b: object distance (refer to FIG. 3)

On the other hand, when the document placement direction is the main scan direction, i.e., when horizontal placement is specified, the image forming state of the document image is optimized by inclining the line sensor relative to the document platen 20.

Figure 5A:
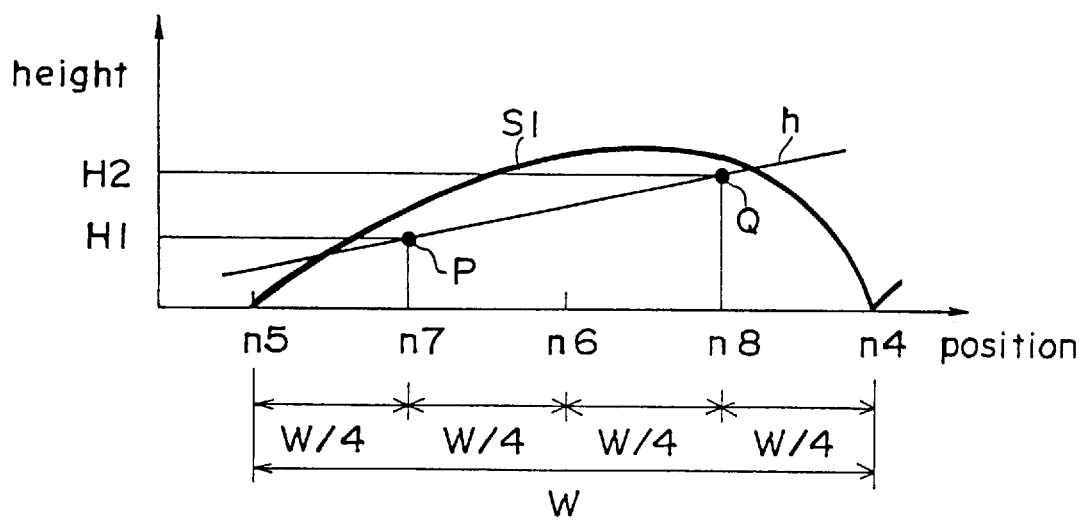
FIGS. 5(A) and 5(B) illustrate a method of calculating the degree of curvature in horizontal placement.
Figure 5B:
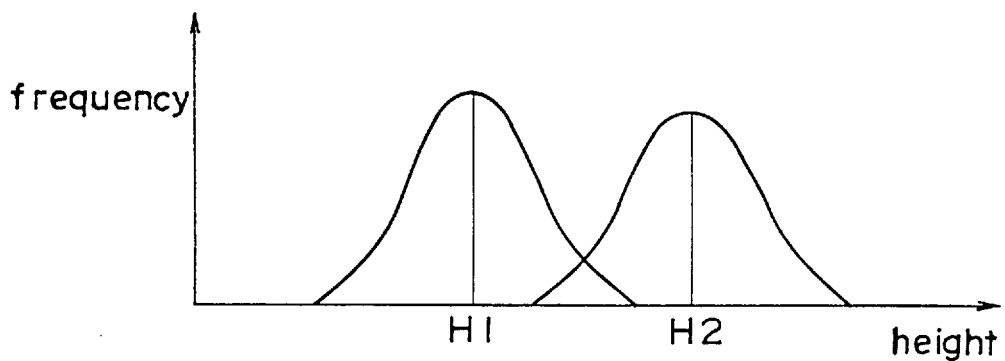
Figure 6:
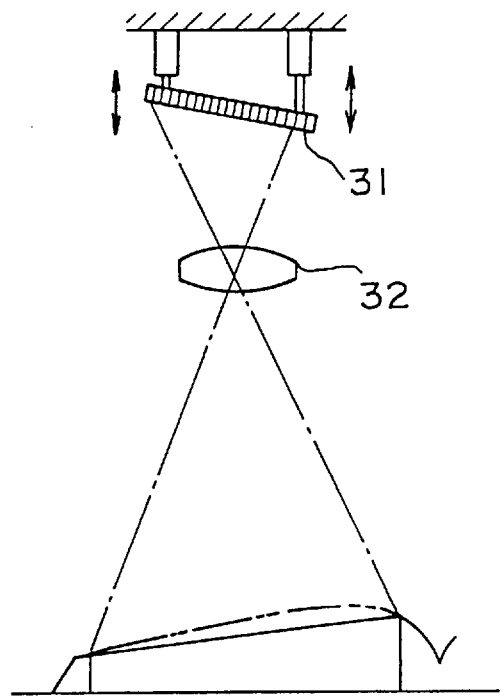
FIG. 6 is a view of focusing adjustment in horizontal placement.
Figure 7:
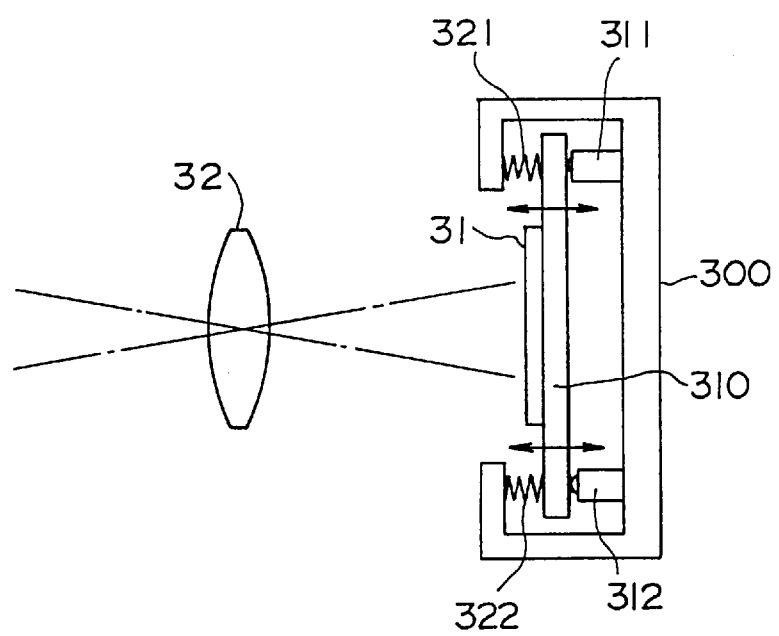
FIG. 7 shows the mounting construction of a line sensor.

FIGS. 5(A) and 5(B) illustrate a method of calculating the degree of curvature in horizontal placement, FIG. 6 illustrates the focusing adjustment in horizontal placement, and FIG. 7 shows the mounting construction of line sensor 31.

As shown in FIGS. 5(A) and 5(B), in the case of horizontal placement, the straight line h passing through two points P and Q approximates the document surface S1. Point P is a point at height H1 separated from the standard pixel position n5 described in FIG. 4 by only a distance corresponding to ¼ of the document length W on the bottom side in the main scan direction. Point Q is a point at height H2 separated from said pixel position n5 by only a distance corresponding to ¾ of the document length W. The document length W is the distance between pixel positions n5 and n4. The height H1 is a representative value of the height of the latter half (left half in FIG. 5) of document surface S1, and is the maximum height when determining the luminance distribution of heights between pixel position n5 and pixel position n6 separated from said pixel position n5 by only a distance equivalent to ½ the document length W. Height H2 is a representative value of the height on the front half (right half in FIG. 5) of document surface S1, and is a maximum height when determining the height distribution between pixel position n6 and pixel position n4.

The line sensor 31 is inclined as shown in FIG. 6 in accordance with the inclination of straight line h which approximates the document surface S1. The angle of inclination at this time is calculated based on the previously mentioned Equation (1). That is, the photoreceptor part corresponding to a low position within the document surface is moved nearer to the image forming lens 32, and the photoreceptor part corresponding to the high position is moved farther from the image forming lens 32.

As shown in FIG. 7, line sensor 31 is mounted on a plate 310 supported by scanner (movable unit) 300 via piezoelectric elements 311 and 312. The plate 310 normally presses against piezoelectric elements 311 and 312 via springs 321 and 322. The line sensor 31 can be inclined by applying an electric field causing the respective piezoelectric elements 311 and 312 to expand.

Figure 8A:
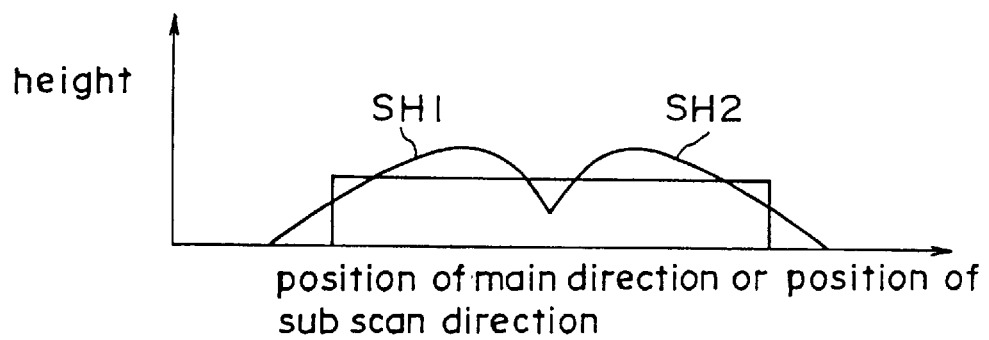
FIGS. 8(A) and 8(B) illustrates first and second methods of automatic discrimination of the document placement direction.
Figure 8B:
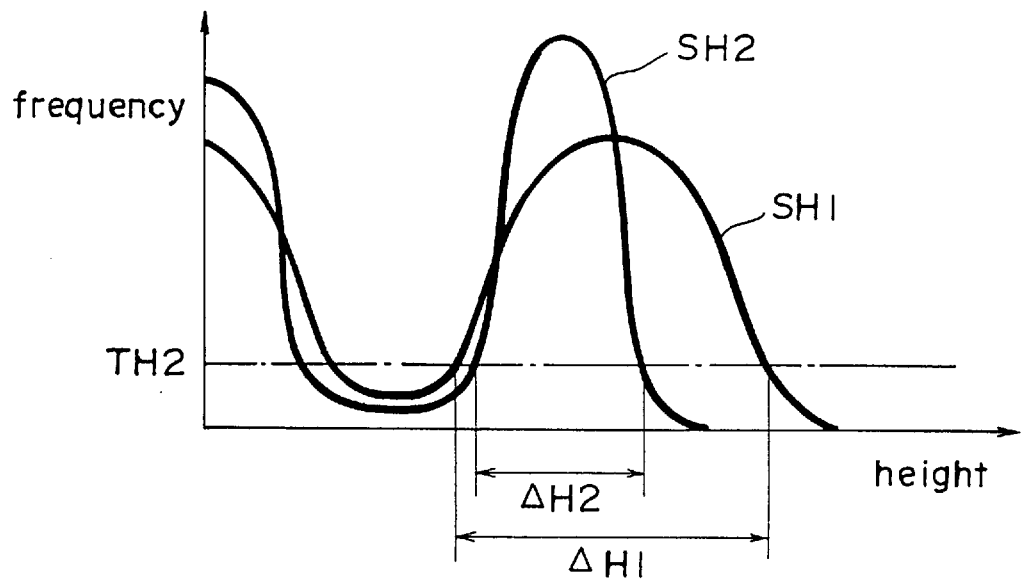
Figure 9A:
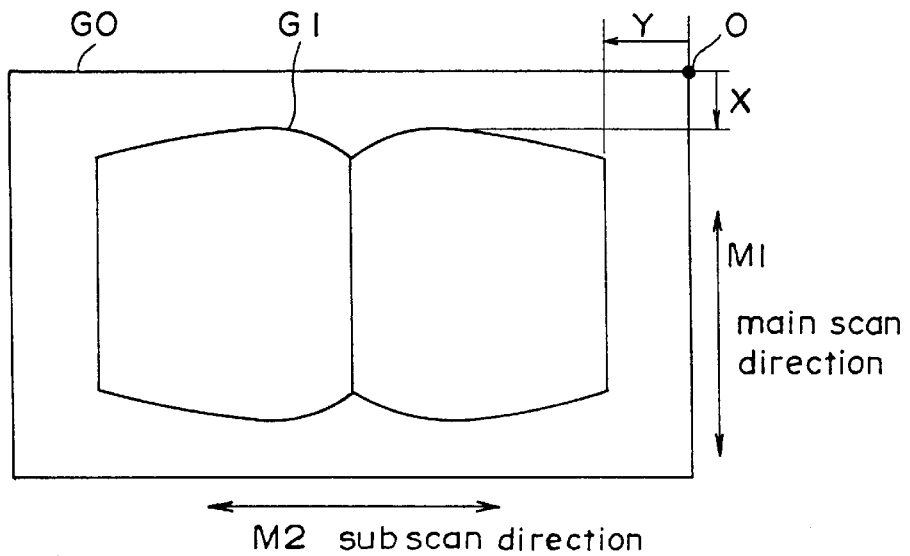
FIGS. 9(A) and 9(B) illustrate a third method of automatic discrimination of the document placement direction.
Figure 9B:
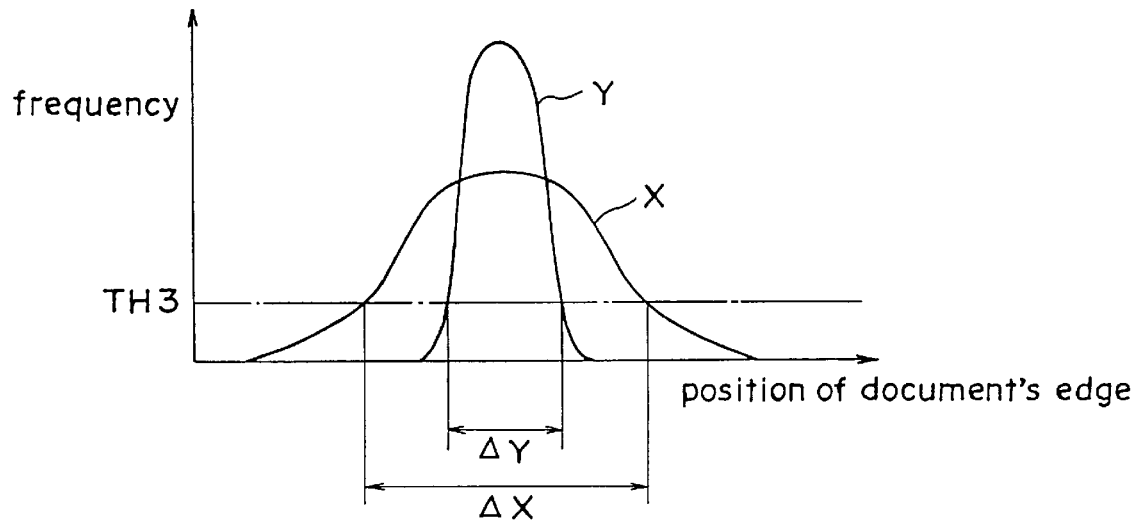

FIGS. 8(A) and 8(B) illustrate first and second methods of automatic discrimination of the document placement direction, and FIGS. 9(A) and 9(B) illustrate a third method of automatic discrimination of the document placement direction.

As shown in FIG. 8(A), the height of document surface S1 changes depending on the position in the document placement direction, whereas the height of the document surface S1 is virtually uniform in a direction perpendicular to the document placement direction. When a book document BD is placed face upward as in the present embodiment, the height distribution SH1 in the direction of document placement forms a V-shaped distribution at the boundary between right and left pages (i.e., at the binding region of the document) (this condition is designated "condition I"). Furthermore, the height distribution at the center part of each page forms a peaked distribution (this condition is designated "condition II"). Such characteristics distributions are not manifest in the direction perpendicular to the document placement direction.

Accordingly, when the height distribution in the subscan direction is checked by means of the image reflected in projection panel 18a, vertical document placement is discriminated if at least one condition among the two conditions I and II is satisfied since the subscan direction is the direction of document placement. Conversely, when the height distribution in the main scan direction is checked by means of the image reflected in projection panel 18b, horizontal document placement is discriminated if at least one condition among the two conditions I and II is satisfied since the main scan direction is the direction of document placement. When only condition I is satisfied, a large page size is assumed equivalent to the maximum reading size of a single page document. The first method of automatic discrimination discriminates the document placement direction by whether or not conditions I and II are satisfied.

A second method of automatic discrimination is a method of discriminating the document placement direction by monitoring the degree of change in the height of the document surface. The degree of height distribution is determined for the main scan direction and the subscan direction, and the height range (i.e., range of height variation) exceeding a predetermined value, i.e., the height range exceeding a threshold value TH2 is calculated. The range of height variation ΔH1 in the direction of document placement is broader than the range of height variation ΔH2 in a direction perpendicular to the direction of document placement. Accordingly, if the range of height variation in the subscan direction is broader than the range of height variation in the main scan direction, the document placement direction is determined to be vertical placement because the subscan direction is the direction of document placement. Conversely, if the range of height variation in the main scan direction is broader than the range of height variation in the subscan direction, the document placement direction is determined to be horizontal placement because the main scan direction is the direction of document placement.

Although the previously described two methods of automatic discrimination use the results of measurements of the height of document surface S1, the direction of document placement can be discriminated without measuring said document surface height. A third method of automatic discrimination uses image distortion in a direction perpendicular to the direction of document placement as illustrated in FIG. 4.

As shown in FIG. 9(A), the distance from standard position O for the analysis of the read image G0 to the edge of projection image (document image) G1 in the main scan direction M1 is designated X, and the distance from the standard position 0 to the edge of projection image G1 in the subscan direction is designated Y. First, the distance (number of pixels) X at each position in the subscan direction M2 is checked to determine the pixel distribution of distance X, and the distance Y is checked at each position in the main scan direction M1 to determine the pixel distribution of distance Y. Then, the range of distance X (i.e., range of variation) $\Delta X$ in which the number of pixels exceeds a threshold TH3 is calculated, and the range of distance Y (i.e., range of variation) $\Delta Y$ in which the number of pixels exceeds a threshold TH3 is calculated. The range of variation $\Delta X$ and the range of variation $\Delta Y$ are compared. In a typical book document BD, the edge of the document in the placement direction is linear, whereas the edge of the book document in a direction perpendicular to the placement direction is curved. Accordingly, when the range of variation $\Delta X$ is broader than the range of variation $\Delta Y$ (as in the case of the example in FIG. 9(B)), the document placement direction is vertical placement because the subscan direction is the placement direction. Conversely, when the range of variation $\Delta Y$ is broader than the range of variation $\Delta X$, the document placement direction is horizontal placement because the main scan direction is the placement direction.

Figure 10:
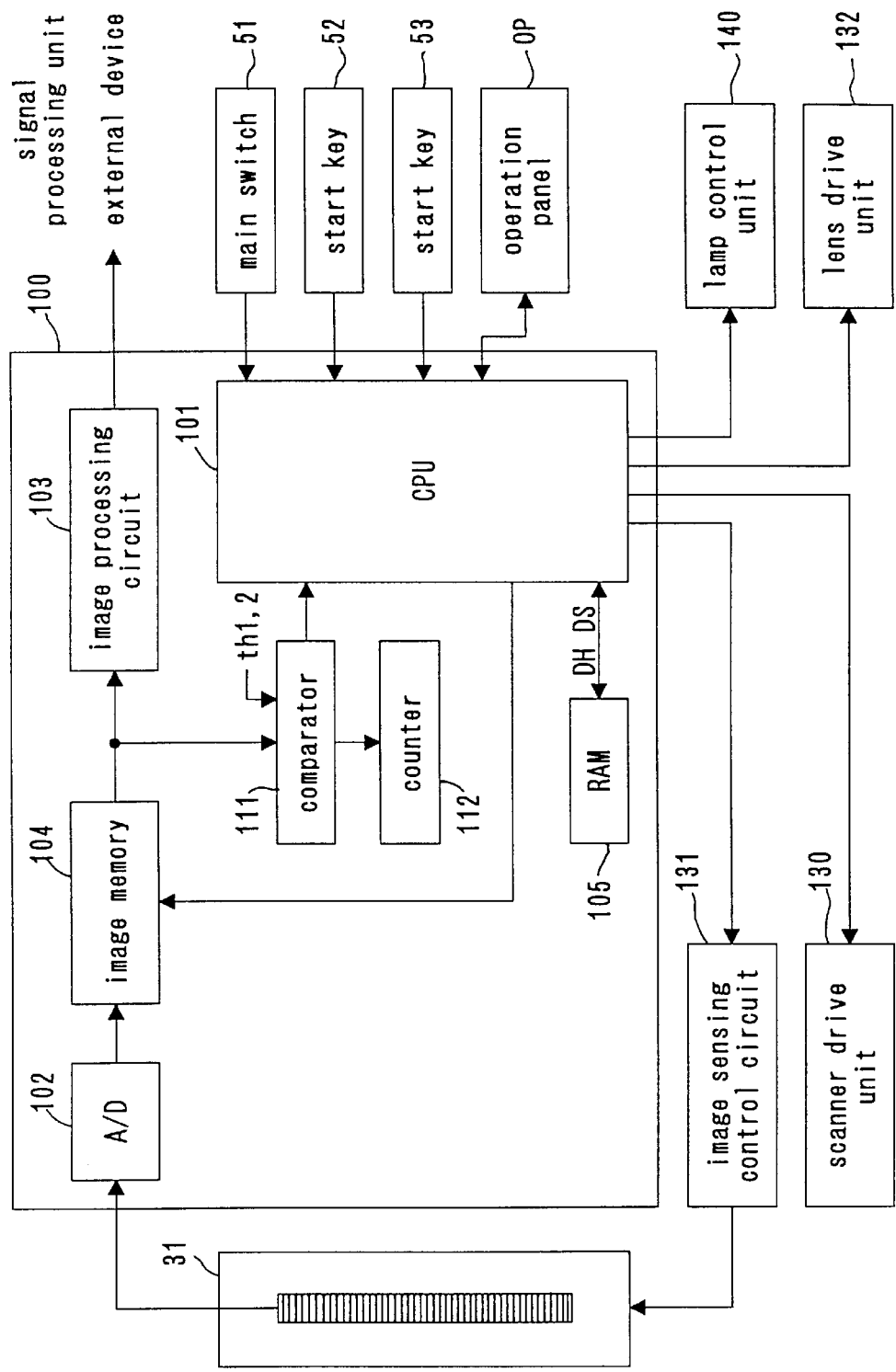
FIG. 10 is a block diagram of the signal processing unit of the book scanner.

FIG. 10 is a block diagram of signal processing unit 100 of book scanner 1.

Signal processing unit 100 comprises a central processing unit (CPU) 101, analog-to-digital (A/D) converter 102, image memory 104, image processing circuit 103, random access memory (RAM) 105, comparator 111, and counter 112.

Photoelectric conversion signals output from line sensor 31 are converted to image data, for example, in 8-bit pixel units by A/D converter 102. Image data are written to image memory 104 in their scanning sequence. That is, read image G0 is temporarily stored in image memory 104. Image memory 104 is provided for 90° rotation of read image G0 is necessary. Image rotation can be realized by substituting the relationship of equivalence between the address (i.e., line address, column address) in image memory 104 and the scanning direction (i.e., main scan direction, subscan direction) during writing and during reading. When the read image G0 is rotated 90° in the case of, for example, horizontal placement, data processing such as image analysis and distortion correction and the like can be readily accomplished in essentially the same manner as for vertical placement, thereby making control simple.

During the pre-scan, image data read out from image memory 104 in a predetermined sequence is input to comparator 111, comparator 111 compares the input image data to threshold values th1 and th2, and transmits the comparison result to CPU 101 and counter 112. Counter 112 counts the number of pixels exceeding the threshold value th1. That is, the height of document surface S1 is measured. CPU 101 fetches the count value from counter 112, and generates document height data DH expressing the state of curvature of document surface S1. CPU 101 further fetches the pixel positions n3 and n4 detected by comparator 111, and generates size data DS expressing the apparent size of the flat surface of the document. The document height data DH and the document size data DS are temporarily stored in RAM 105. After the pre-scan ends, CPU 101 generates control data for focus adjustment and image distortion correction in preparation for a main scan. The length of one page of document surface S1 in the direction of placement (i.e., page length) is determined, and the output image range (i.e., effective reading range) is set. When automatic paper selection (APS) or automatic magnification selection AMS) is executed, paper size and reading magnification suitable for the page length are set.

During the main scan, image data are read out from image memory 104 in a predetermined sequence, and input to image processing circuit 103. Image processing circuit 103 manages processes including processing to correct uneven illumination of document surface S1, correction processing such as MTF correction for improving image quality, image distortion correction to correct distortion caused by curvature of document surface S1, density correction, and masking to designate the exterior side of the output image range as empty space and the like. Image data subjected to predetermined image processing are output to an exterior device (e.g., digital copier).

CPU 101 manages the control of drive systems including scanner drive unit 130, image sensing control circuit 131, lens drive unit 132, and lamp control unit 140. The parallel movement of scanner 300 and the application of electric fields to piezoelectric elements 311 and 312 are accomplished by the scanner drive unit 130. The image sensing control circuit 131 supplies drive signals of various types to line sensor 31. The lens drive unit 132 arranges the image forming lens 32 at suitable positions. Various types of switches including operation panel OP, and start keys 52 and 53 are connected to CPU 101. RAM 105 is used to temporarily store various types of data related to controls.

The operation of book scanner 1 is described hereinafter with reference to the flow charts.

Figure 11:
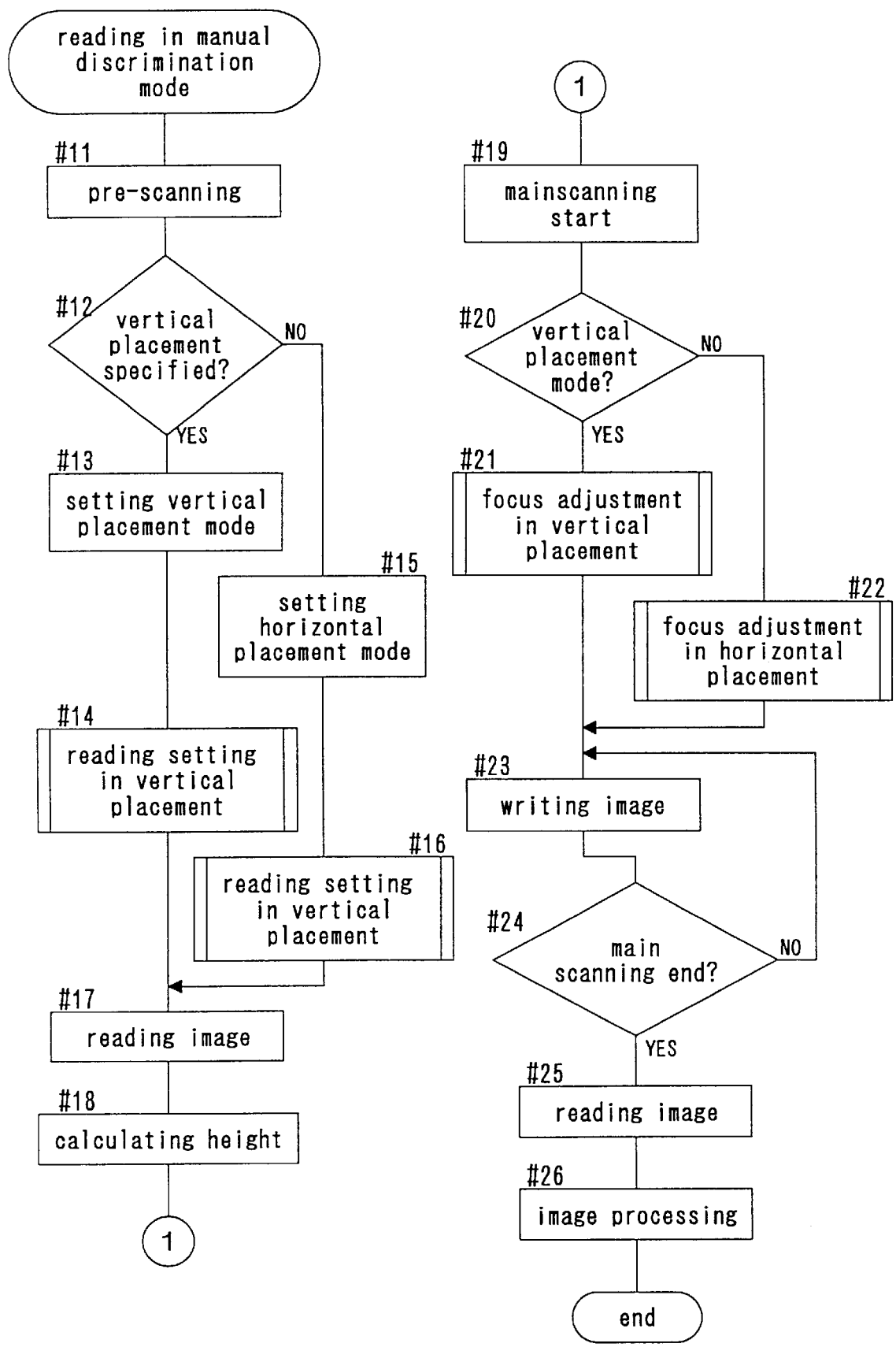
FIG. 11 is a main flow chart of the reading control operation of a central processing unit (CPU) in a manual discrimination mode.

FIG. 11 is a main flow chart of the reading control operation executed by CPU 101 in the manual discrimination mode.

When a user finishes inputting required settings and the start key is turned ON, CPU 101 issues a command to the lamp control unit 140 to light the illumination lamp, and issues commands to start the pre-scan to scanner drive unit 130 and image sensing control unit 131 (#11). During the pre-scan, the read image G0 is written to image memory 104 as previously mentioned. During this writing to memory, the line address corresponds to the subscan direction and the column address corresponds to the main scan direction.

At the moment the pre-scan ends, a check is made to determine the user-specified content relating to the document placement direction (#12). When vertical placement has been specified, the vertical placement mode is set (#13), and vertical reading settings are set to read the document image without rotating the image G0 read from image memory 104 (#14). When horizontal placement has been specified, the horizontal placement mode is set (#15), and horizontal reading settings are set to read the document image by rotating the image G0 read from image memory 104 (#16). The various pixel data of read image G0 are read in the sequence set in steps #14 and #16 (#17), the height of the document surface is determined, and control data are generated for focus adjustment and distortion correction (#18).

The main scan is started (#19), and the placement mode is checked (#20). If the vertical placement mode is set, vertical placement focus adjustment is executed (#21), whereas if horizontal placement is set, horizontal placement focus adjustment is executed (#22). Image data are written to image memory 104 in the same sequence as in the pre-scan until the main scan ends (#23, #24). When the main scan ends, image data are read out from image memory 104 in the sequence set in steps #14 and #16 (#25), and correction commands corresponding to document height data DH are issued to image processing circuit 103 (#26). A command is issued to turn OFF the illumination lamp at the moment image output to an external device is completed.

Figure 12:
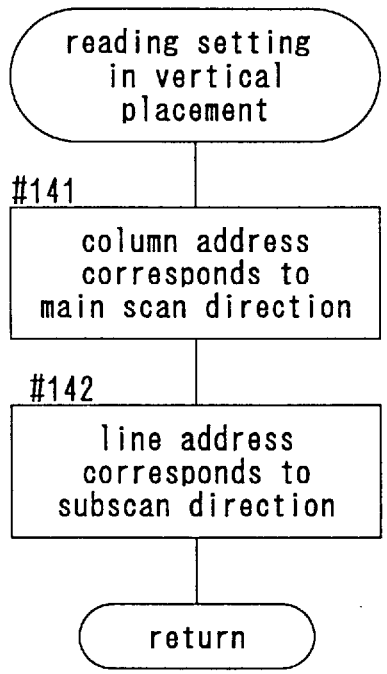
FIG. 12 is a flow chart of the reading setting in vertical placement.

FIG. 12 is a flow chart of the reading settings in vertical placement.

The column address when reading from image memory 104 corresponds to the main scan direction, and the line address corresponds to the subscan direction in the same manner as during the writing process (#141, #142).

Figure 13:
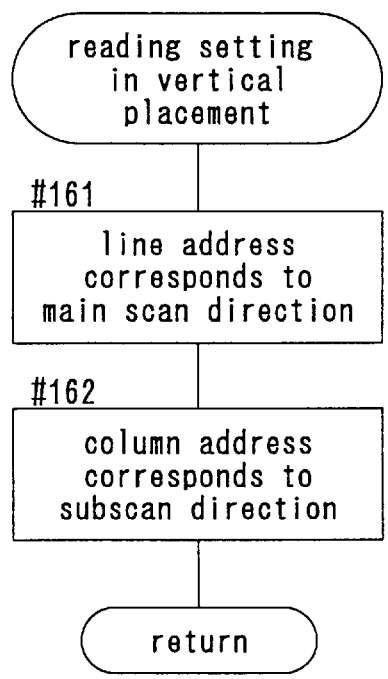
FIG. 13 is a flow chart of the reading setting in horizontal placement.

FIG. 13 is a flow chart of the reading settings in horizontal placement.

Conversely to the reading process, the line address when reading from image memory 104 corresponds to the main scan direction and the column address corresponds to the subscan direction (#161, #162). Thus, the image of read image G0 rotated 900 is transmitted to the image processing circuit 103.

Figure 14:
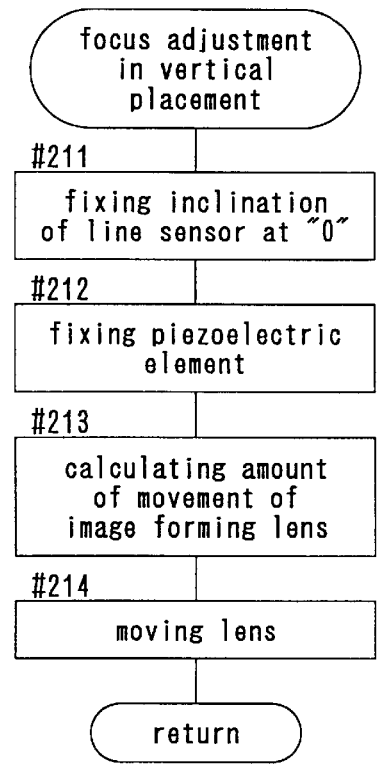
FIG. 14 is a flow chart of the focusing adjustment in vertical placement.

FIG. 14 is a flow chart of focus adjustment in vertical placement.

The inclination of line sensor 31 is fixed at zero (0) (#211), and piezoelectric elements 311 and 312 are maintained in the initial state (#212). The amount of movement of image forming lens 32 is calculated (#213), and a lens movement command is issued to lens drive unit 132 (#214). That is, in this routine, focus control is executed in accordance with the change in the document height in the subscan direction.

Figure 15:
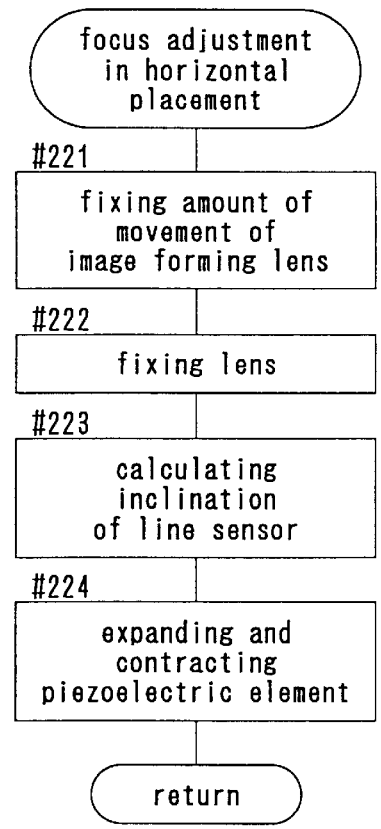
FIG. 15 is a flow chart of the focusing adjustment in horizontal placement.

FIG. 15 is a flow chart of focus adjustment in horizontal placement.

The amount of movement of image forming lens 32 is fixed at zero (0) (#221), and image forming lens 32 is maintained in the initial state (#222), the inclination angle of line sensor 31 is calculated (#223), and commands to expand and contract piezoelectric elements 311 and 312 are issued to the scanner drive unit 130 (#224). That is, in this routine, focus control is executed in accordance with the change in the document height in the main scan direction.

Figure 16:
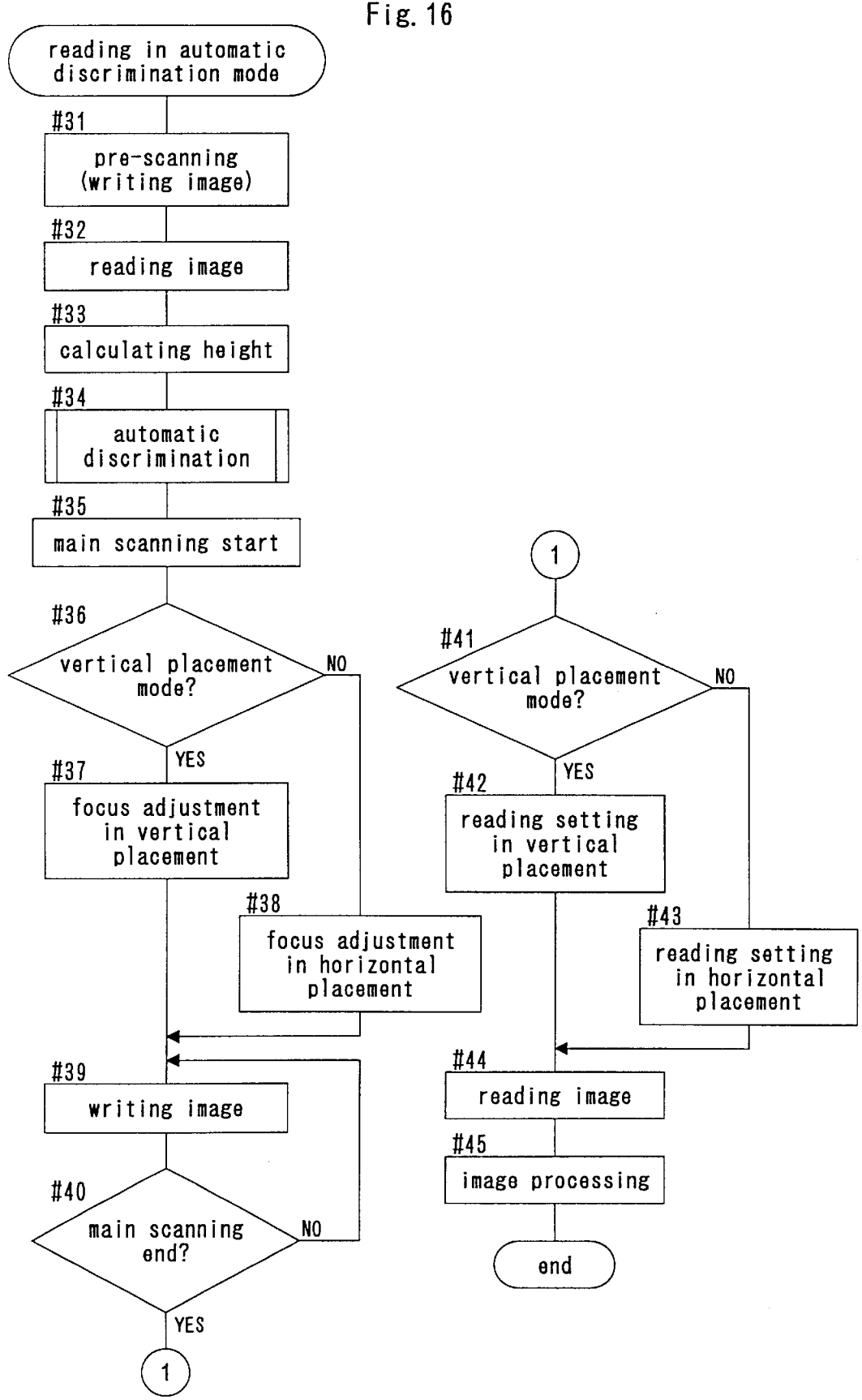
FIG. 16 is a main flow chart of the reading control operation of a central processing unit (CPU) in a automatic discrimination mode.

FIG. 16 is a main flow chart of the reading control operation executed by CPU 101 in the automatic discrimination mode.

CPU 101 issues a command to turn ON the illumination lamp in response to the start key being turned ON, and issues commands to start the pre-scan to scanner drive unit 130 and image sensing control unit 131 (#31). During the pre-scan, the image data of each pixel of the read image G0 is written to image memory 104. During this writing to memory, the line address corresponds to the subscan direction and the column address corresponds to the main scan direction.

When the pre-scan ends, image data are read out from image memory 104 (#32), and a height calculation process is executed to calculate the height of the document surface by analysis of the read image G0 (#33). The document placement direction is discriminated based on the information obtained by the aforesaid image analysis, and the automatic discrimination mode is executed to set the operation mode (#34), and the main scan is started (#35). A mode check is executed (#36), and if the vertical placement mode is set, vertical placement focus adjustment is executed by the movement control routine of image forming lens 32 (#37), whereas if the horizontal placement mode is set, horizontal placement focus adjustment is executed by the expansion control routine of piezoelectric elements 311 and 312 (#38).

Image data are written to image memory 104 in the same sequence as in the pre-scan until the main scan ends (#39, #40).

When the main scan ends, a mode check is again executed (#41). If the vertical placement mode is specified, vertical reading settings are set to read the document image without rotating the image G0 read from image memory 104 (#42). If the horizontal placement mode is specified, horizontal reading settings are set to read the document image by rotating the image G0 read from image memory 104 (#43). The various pixel data of read image G0 are read from image memory 104 in the sequence set in steps #42 and #43, and transmitted to image processing circuit 103 (#44). CPU 101 issues commands to image processing circuit 103 for the corrections in accordance with document height data DH (#45). A command is issued to turn OFF the illumination lamp at the moment image output to an external device is completed.

Figure 17:
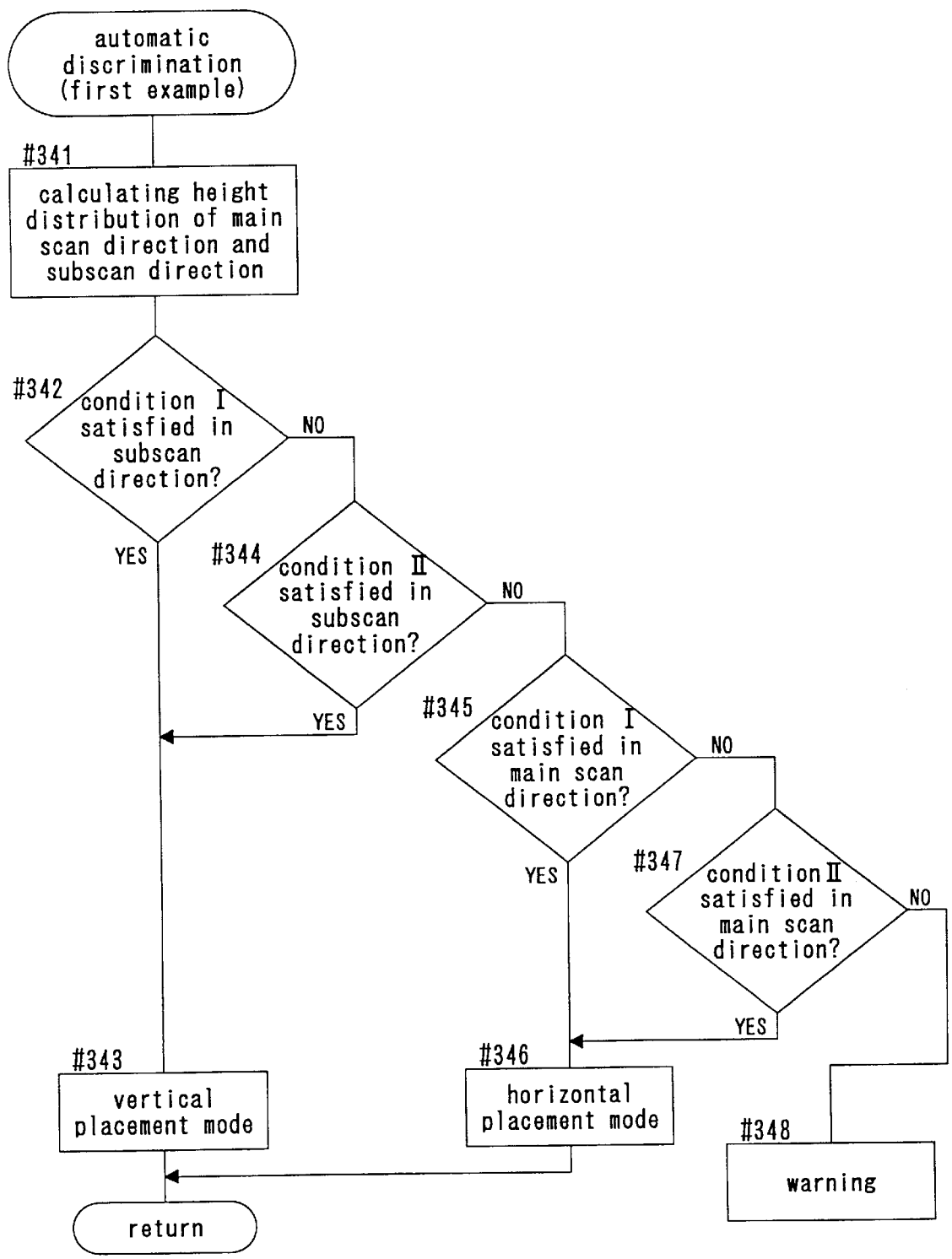
FIG. 17 is a flow chart showing a first example of the automatic discrimination process.

FIG. 17 is a flow chart showing a first example of the automatic discrimination process.

In this routine, the document placement direction is discriminated using the previously mentioned first automatic discrimination method. First, the height distributions of the document surface is determined in the subscan direction and the main scan direction (#341). Specifically, the count value of counter 112 is fetched, and document height data DH are generated for each direction.

Then, a check is made to determined whether or not the height distribution in the subscan direction satisfies the previously mentioned condition I (#342). If condition I is satisfied, the vertical placement mode is set (#343). If condition I is not satisfied, a check is made to determine whether or not condition II is satisfied (#344). If condition II is satisfied, the vertical placement mode is set (#343). When the height distribution in the subscan direction satisfies neither condition I nor condition II, a check is made to determine whether or not the height distribution in the main scan direction satisfies condition I (#345). If condition I is satisfied, the horizontal placement mode is set (#346), when condition I is not satisfied, a check is made to determine whether or not condition II is satisfied (#347). If condition II is satisfied, the horizontal placement mode is set (#346).

When neither condition I nor condition II is satisfied in both the subscan direction and the main scan direction, a warning message alerting to the fact that the document placement direction cannot be discriminated is displayed on the display of the operation panel OP. In this case, a user may correct the placement of book document BD, or switch the automatic discrimination mode to the manual discrimination mode to specify the document placement direction.

Figure 18:
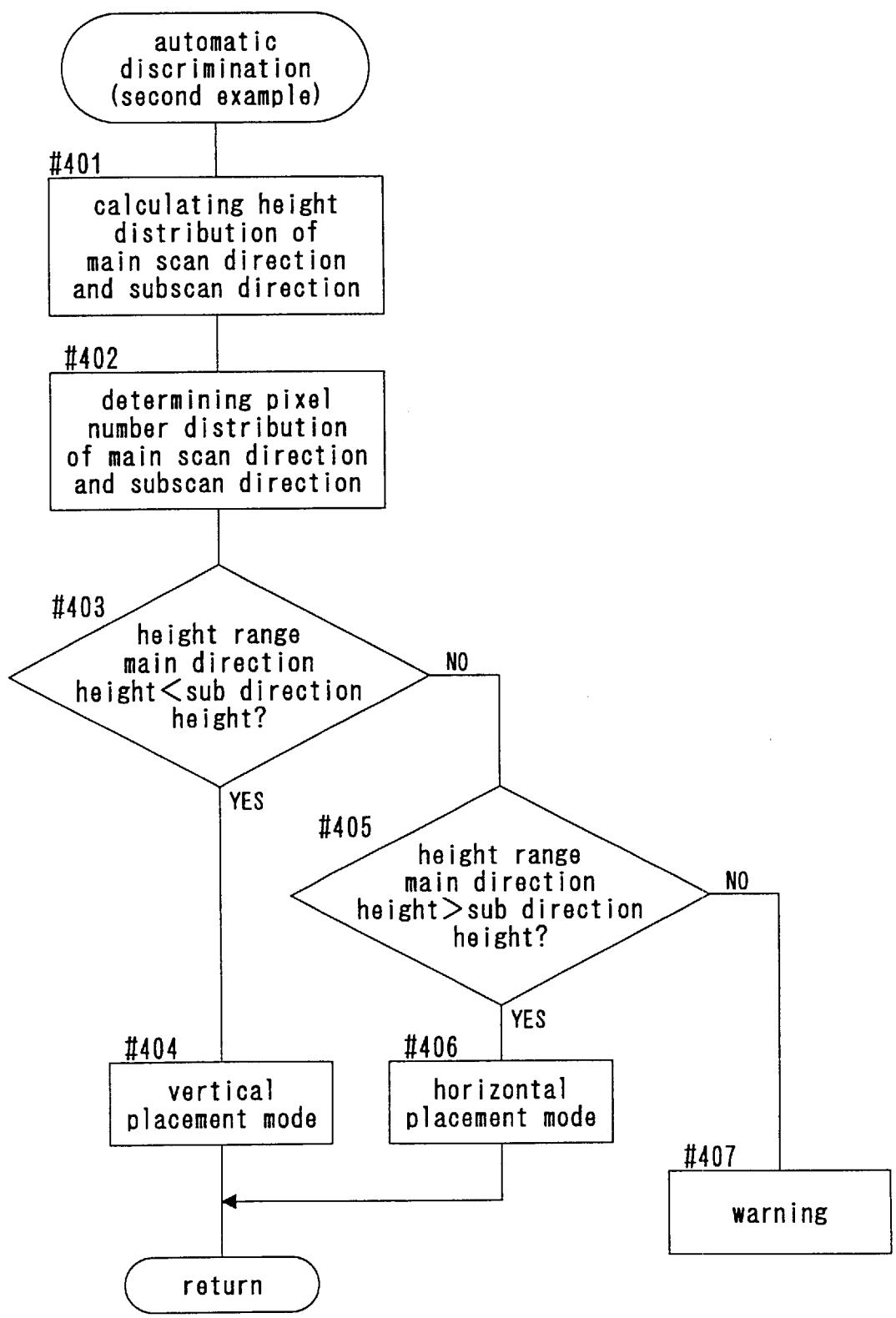
FIG. 18 is a flow chart showing a second example of the automatic discrimination process.

FIG. 18 is a flow chart showing a second example of the automatic discrimination process.

In this routine, the document placement direction is discriminated by the previously described second automatic discrimination method. First, the height distributions of the document surface is determined in the subscan direction and the main scan direction (#401). Then, the pixel number distributions of the height of the document surface is determined in the subscan direction and the main scan direction (#402). At this time, the height ranges ($\Delta H1$, $\Delta H2$) at which the number of pixels exceeds a threshold value TH2 (refer to FIG. 8) are calculated for each direction.

Next, the height range in the subscan direction and the height range in the main scan direction are compared. When the height range in the subscan direction is clearly broader than the height range in the main scan direction, i.e., when the difference in the height ranges exceeds a predetermined value, the vertical placement mode is set (#403, #404). Conversely, when the height range in the main scan direction is clearly broader than the height range in the subscan direction, the horizontal placement mode is set (#405, #406). When there is not a marked difference in the height ranges in either direction, i.e., when the height range cannot be specified because the pixel number distribution is flat, a warning message alerting to the fact that the document placement direction cannot be discriminated is displayed on the display of the operation panel OP (#407).

Figure 19:
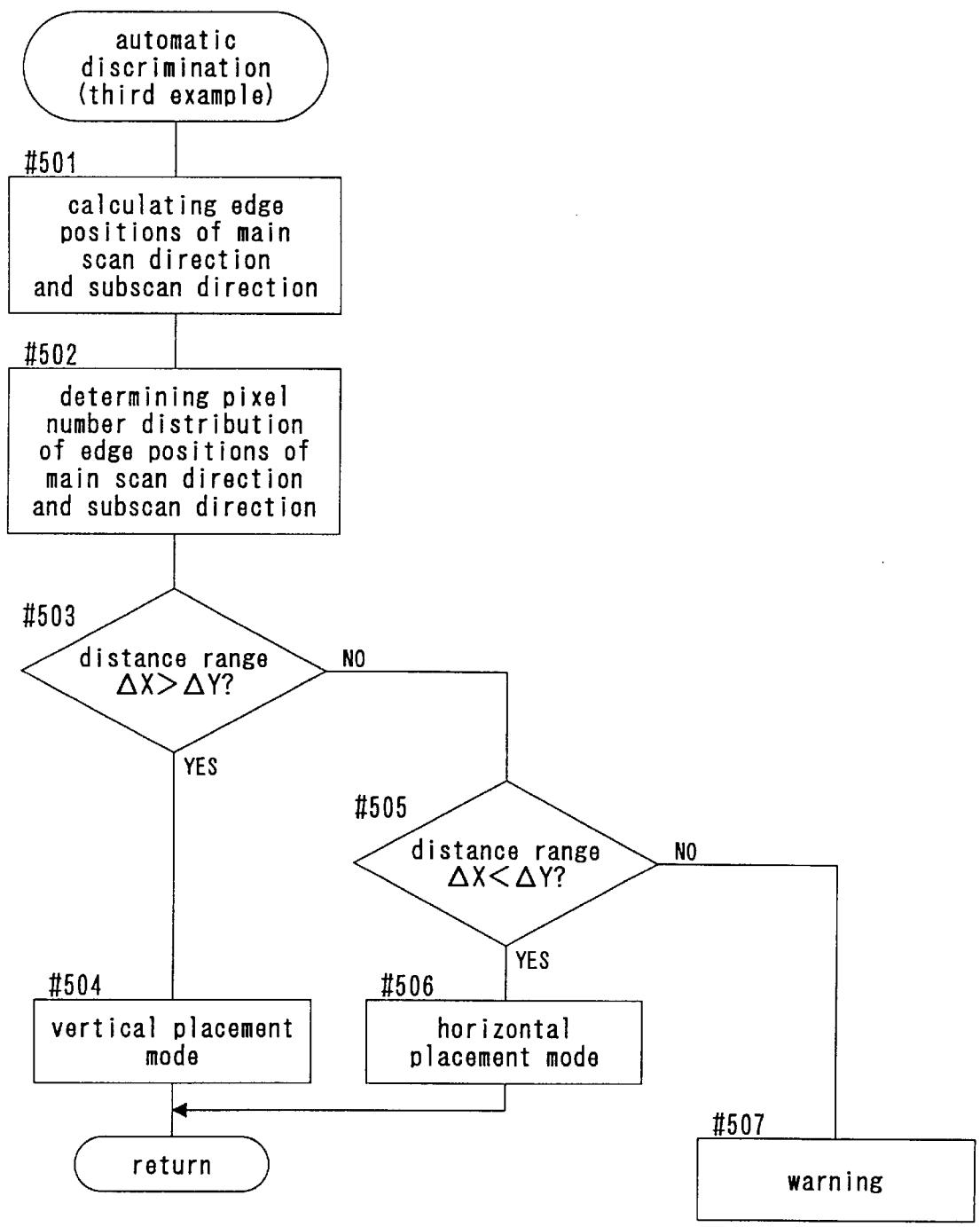
FIG. 19 is a flow chart showing a third example of the automatic discrimination process.

FIG. 19 is a flow chart showing a third example of the automatic discrimination process.

In this routine, the document placement direction is discriminated by the previously mentioned third automatic discrimination method. First, the pixel position n3 (refer to FIG. 4) is detected based on the output of comparator 111, and the distances X and Y (refer to FIG. 9) expressing the positions of the document edges are calculated in the main scan direction and the subscan direction (#501). Then, the pixel number distribution at the document edge positions are calculated in the main scan direction and the subscan direction (#502). At this time, the distance ranges $\Delta X$ and $\Delta Y$ at which the pixel number exceeds a threshold value TH3 are calculated in each direction.

Next, the distance range $\Delta X$ in the main scan direction and the distance range $\Delta Y$ in the subscan direction are compared. When the distance range $\Delta X$ in the main scan direction is clearly broader than the distance range $\Delta Y$ n the subscan direction, the vertical placement mode is set (#503, #504). Conversely, when the distance range $\Delta Y$ in the subscan direction is clearly broader than the distance range $\Delta X$ in the mains scan direction, the horizontal placement mode is set (#505, #506). When there is not a marked difference in the height ranges $\Delta X$ and $\Delta Y$ in either direction, i.e., when the height range $\Delta X$ and $\Delta Y$ cannot be specified because the pixel number distribution is flat, a warning message alerting to the fact that the document placement direction cannot be discriminated is displayed on the display of the operation panel OP (#507). Although images reflected in projection panels 18a and 18b were analyzed to measure document surface height in two directions in the aforesaid embodiments, it is to be noted that curvature information of the document surface in the main scan direction and the subscan direction may be obtained by light projection methods wherein slit light is projected bidirectionally. Furthermore, while the sequence of writing to image memory 104 has been described as fixed and the sequence of reading from image memory 104 has been described as switchable, it is to be understood that the sequence of reading may be fixed and the sequence of writing may be switchable to realize image rotation.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reading apparatus which reads a document surface of an open book-like document placed on a document platen in a face upward condition, said image reading apparatus comprising:

first detecting means for detecting a height distribution of the document surface in a main scanning direction;

second detecting means for detecting a height distribution of the document surface in a sub-scanning direction; and direction discrimination means for discriminating whether a placement direction of said document is the main scanning direction or a sub-scanning direction based on the height distribution in the main scanning direction and the height distribution in the sub-scanning direction.

2. The image reading apparatus according to claim 1, further comprising:

third detecting means for detecting a portion which forms a V-shaped distribution in the height distributions detected by the first and the second detecting means.

3. The image reading apparatus according to claim 1, wherein said discrimination means determines that the placement direction is the main scanning direction when the V-shaped distribution is in the height distribution by the first detecting means, and determines that the placement direction is sub-scanning direction when the V-shaped distribution is in the height distribution by second detecting means.

4. The image reading apparatus according to claim 1, wherein said first detecting means and said second detecting means detect a portion which forms peaked distribution in the height distributions detected by the first and the second detecting means.

5. The image reading apparatus according to claim 1, wherein said discrimination means determines that the placement direction is the main scanning direction when a peaked distribution is detected by the first detecting means, and determines that the placement direction is the sub-scanning direction when the peaked distribution is detected by the second detecting means.

6. An image reading apparatus which reads a document surface of an open book-like document placed on a document platen in a face upward condition, said image reading apparatus comprising:

a sensor which converts a document image to electrical signals;

first detecting means for detecting a height distribution of the document surface in a main scanning direction;

second detecting means for detecting a height distribution of the document surface in a sub-scanning direction;

focusing means for focusing the document image on said sensor; and focus control means which controls said focusing means in accordance with the height distribution in the sub-scanning direction when the document placement direction is the sub-scanning direction, and controls said focusing means in accordance with the height distribution in the main scanning direction when the document placement direction is the main scanning direction.

7. The image reading apparatus according to claim 6, wherein said first detecting means includes a reflecting panel being extended in the main scanning direction which reflects an edge surface of the document to the sensor.

8. The image reading apparatus according to claim 6, wherein said second detecting means includes a reflecting panel being extended in the sub-scanning direction which reflects an edge surface of the document to the sensor.

9. An image reading apparatus which reads a document surface of an open book-like document placed on a document platen in a face upward condition, said image reading apparatus comprising:

a sensor which converts a document image to electrical signals;

first detecting means for detecting a height distribution of the document surface in a main scanning direction;

second detecting means for detecting a height distribution of the document surface in a sub-scanning direction;

image processing means for correcting distortion of a read image caused by a curvature of the document surface; and correction control means for controlling said image processing means in accordance with the height distribution in the sub-scanning direction when a document placement direction is the sub-scanning direction, and controlling said image processing means in accordance with the height distribution in the main scanning direction when the document placement direction is the main scanning direction.

10. The image reading apparatus according to claim 9, wherein said first detecting means includes a reflecting panel being extended in the main scanning direction which reflects an edge surface of the document to the sensor.

11. The image reading apparatus according to claim 9, wherein said second detecting means includes a reflecting panel being extended in the sub-scanning direction which reflects an edge surface of the document to the sensor.

12. An image reading apparatus which reads a document surface of an open book-like document placed on a document platen in a face upward condition, said image reading apparatus comprising:

a sensor which converts a document image to electrical signals;

a first reflecting panel being extended in a main scanning direction which reflects an edge surface of an open-faced document to the sensor;

a second reflecting panel being extended in a sub-scanning direction which reflects the edge surface of the open-faced document to the sensor;

direction discrimination means for discriminating whether a placement direction of said document is main scanning direction or a sub-scanning direction based on image reading information of said edge surface in each said direction expressing the state of curvature of the document surface; and changing means for changing a reading condition in accordance with the placement direction.

13. An image reading method for reading a document surface of an open book-like document placed on a document platen in a face upward condition by said image reading method comprising the steps of:

detecting a height distribution of a document surface in a main scanning direction;

detecting a height distribution of the document surface in a sub-scanning direction; and discriminating whether a placement direction of said document is a main scanning direction or a sub-scanning direction based on the height distributions detected by the detecting steps.

14. The image reading method according to claim 13, further comprising:

adjusting a first image reading condition in accordance with the height distribution in the sub-scanning direction when the document placement direction is the sub-scanning direction; and adjusting a second image reading condition in accordance with the height distribution in the main scanning direction when the document placement direction is the main scanning direction.

15. The image reading method according to claim 13, further comprising:

correcting a distortion of a read image caused by a curvature of the document surface in accordance with the height distribution in the sub-scanning direction when a document placement direction is the sub-scanning direction; and correcting the distortion in a read image caused by a curvature of the document surface in accordance with the height distribution in the main scanning direction when the document placement direction is the main scanning direction.

* * * * *

UNITED STATES PATENT AND TRADEMARK OFFICE
CERTIFICATE OF CORRECTION

PATENT NO. : 5,847,884
DATED : December 8, 1998
INVENTOR(S) : Kamon, et al

It is certified that error appears in the above-identified patent and that said Letters Patent is hereby corrected as shown below:

Title page, Insert --[30], Foreign Application Priority Data:

Jul. 10, 1996 [JP] Japan        08-180521
    Jul. 10, 1996 [JP] Japan        08-180522-- column 1, line 16, delete "and" and insert --or--.

column 1, line 19, before "a pre-scan" insert --and--.

column 1, line 21, delete "base" and insert --based--.

column 1, line 41, delete the comma after "curvature".

column 2, line 15, delete "said" and insert --the--.

column 2, line 31, delete ", and reducing" and insert --and to reduce--.

column 2, line 47, delete "control" and insert --controls--.

column 2, line 49, before "the" insert --when--.

UNITED STATES PATENT AND TRADEMARK OFFICE
CERTIFICATE OF CORRECTION

PATENT NO. : 5,847,884
DATED : December 8, 1998
INVENTOR(S) : Kamon, et al

It is certified that error appears in the above-identified patent and that said Letters Patent is hereby corrected as shown below:

column 3, line 31, delete "show" and insert --are perspective views showing--.

column 3, line 32, delete "show" and insert --are schematic views of--.

column 3, line 34, delete "illustrate" and insert --are illustrations of--.

column 3, line 36, delete "illustrate" and insert --are illustrations of--.

column 3, line 38, delete "view of" and insert --schematic view illustrating--.

column 3, line 40, delete "shows" and insert --is a schematic view showing--.

column 3, line 41, delete "illustrates" and insert --are illustrations of--.

column 3, line 45, delete "illustrate" and insert --are illustrations of--.

column 4, line 7, delete "show" and insert --are perspective views showing--.

column 4, line 8, delete "show" and insert --are schematic views showing--.

column 4, line 17, before "arranged" insert --is--.

UNITED STATES PATENT AND TRADEMARK OFFICE
CERTIFICATE OF CORRECTION

PATENT NO. : 5,847,884
DATED : December 8, 1998
INVENTOR(S) : Kamon, et al

It is certified that error appears in the above-identified patent and that said Letters Patent is hereby corrected as shown below:

column 4, line 23, delete "on" and insert --which is attached to--.

column 4, line 49, delete "or another of these" and insert --of the--.

column 4, line 55, delete "is".

column 4, line 61, delete "directions" and insert --direction--.

column 4, line 62, insert a space between "mechanism" and "(lens moving unit)".

column 5, line 7, delete "and the and" and insert --and the subscan direction of the document image--.

column 5, line 21, delete "if" and insert --is--.

column 5, line 42, delete "said" and insert --the--.

column 5, line 53, delete "what" and insert --which--.

column 6, line 15, delete "and".

column 6, line 28, delete "and".

UNITED STATES PATENT AND TRADEMARK OFFICE
CERTIFICATE OF CORRECTION

PATENT NO. : 5,847,884
DATED : December 8, 1998
INVENTOR(S) : Kamon, et al

It is certified that error appears in the above-identified patent and that said Letters Patent is hereby corrected as shown below:

column 7, line 1, delete "of".

column 7, line 1-2, delete "increase or decrease".

column 8, line 23, delete "characteristics" and insert --characteristic--.

column 9, line 15, delete "variation)" and insert --variation),--.

column 9, line 17, delete "variation)" and insert --variation),--.

column 10, line 7, delete "AMS)" and insert --(AMS)--.

column 11, line 59, delete "and".

column 12, line 24, delete "is" and insert --are--.

column 12, line 56, delete "is" and insert --are--.

column 12, line 58, delete "is" and insert --are--.

column 12, line 62, delete "FIG. 8)" and insert --FIGS. 8A and 8B)--.

UNITED STATES PATENT AND TRADEMARK OFFICE
CERTIFICATE OF CORRECTION

PATENT NO. : 5,847,884
DATED : December 8, 1998
INVENTOR(S) : Kamon, et al page 5 of 9

It is certified that error appears in the above-identified patent and that said Letters Patent is hereby corrected as shown below:

```
     column 13, line 15, delete "FIG.4)" and insert
--FIGS. 4A and 4B)--.

column 13, line 16, delete "FIG. 9)" and insert
--FIGS.9A and 9B)--.

column 13, line 27, delete "n" and insert
--in--.

column 13, line 31, delete "mains" and insert
--main--.

column 13, line 58, claim 1, delete "apparatus"
and insert --apparatus,--.

column 14, line 3, claim 1, delete "a" and
insert --the--.

column 14, line 7, claim 2, delete "The" and
insert --An--.

column 14, line 11, claim 2, before "and"
insert --detecting means--.

column 14, line 12, claim 3, delete "The" and
insert --An--.

column 14, line 15, claim 3, before "by" insert
--detected--.
```

UNITED STATES PATENT AND TRADEMARK OFFICE
CERTIFICATE OF CORRECTION

PATENT NO. : 5,847,884
DATED : December 8, 1998
INVENTOR(S) : Kamon, et al

It is certified that error appears in the above-identified patent and that said Letters Patent is hereby corrected as shown below:

column 14, line 18, claim 3, before "by" insert --detected--.

column 14, line 18, claim 3, after "by" insert --the--.

column 14, line 19, claim 4, delete "The" and insert --An--.

column 14, line 21, claim 4, before "peaked" insert --a--.

column 14, line 22, claim 4, before "and" insert --detecting means--.

column 14, line 24, claim 5, delete "The" and insert --An--.

column 14, line 31, claim 6, delete "apparatus" and insert --apparatus,--.

column 14, line 52, claim 7, delete "The" and insert --An--.

column 14, line 53, claim 7, delete "panel" and insert --panel,--.

column 14, line 54, claim 7, delete "being".

column 14, line 54, claim 7, delete "direction" and insert --direction,--.

UNITED STATES PATENT AND TRADEMARK OFFICE
CERTIFICATE OF CORRECTION

PATENT NO. :
DATED :  5,847,884
INVENTOR(S) : December 8, 1998
Kamon, et al

It is certified that error appears in the above-identified patent and that said Letters Patent is hereby corrected as shown below:

column 14, line 56, claim 8, delete "The" and insert --An--.

column 14, line 58, claim 8, delete "panel" and insert --panel,--.

column 14, line 58, claim 8, delete "being".

column 14, line 58, claim 8, delete "direction" and insert --direction,--.

column 14, line 60, claim 9, delete "apparatus" and insert --apparatus,--.

column 15, line 14, claim 10, delete "The" and insert --An--.

column 15, line 15, claim 10, delete "panel" and insert --panel,--.

column 15, line 16, claim 10, delete "being".

column 15, line 16, claim 10, delete "direction" and insert --direction,--.

column 15, line 18, claim 11, delete "The" and insert --An--.

column 15, line 20, claim 11, delete "panel" and insert --panel,--.

UNITED STATES PATENT AND TRADEMARK OFFICE
CERTIFICATE OF CORRECTION

PATENT NO. :
DATED : 5,847,884
INVENTOR(S) : December 8, 1998
Kamon, et al

It is certified that error appears in the above-identified patent and that said Letters Patent is hereby corrected as shown below:

column 15, line 20, claim 11, delete "being".

column 15, line 20, claim 11, delete "direction" and insert --direction,--.

column 15, line 22, claim 12, delete "apparatus" and insert --apparatus,--.

column 15, line 28, claim 12, delete "panel" and insert --panel,--.

column 15, line 28, claim 12, delete "being".

column 15, line 29, claim 12, delete "direction" and insert --direction,--.

column 15, line 31, claim 12, delete "panel" and insert --panel,--.

column 15, line 31, claim 12, delete "being".

column 15, line 32, claim 12, delete "direction" and insert --direction,--.

column 15, line 32, claim 12, delete "the" and insert --an--.

column 15, line 39, claim 12, delete "direction" and insert --direction,--.

UNITED STATES PATENT AND TRADEMARK OFFICE
CERTIFICATE OF CORRECTION

PATENT NO. : 5,847,884
DATED : December 8, 1998
INVENTOR(S) : Kamon, et al

It is certified that error appears in the above-indentified patent and that said Letters Patent is hereby corrected as shown below:

column 16, line 16, claim 14, delete "The" and insert --An--.

column 16, line 27, claim 15, delete "The" and insert --An--.

Signed and Sealed this

Twelfth Day of September, 2000

Attest:

Q. TODD DICKINSON

*Attesting Officer*      *Director of Patents and Trademarks*